Aug. 17, 1965   P. G. DRONG   3,201,143
THREE POINT FRONT WHEEL SUSPENSION
Filed Aug. 30, 1962

INVENTOR
PETER G. DRONG
BY Robert M. Dunning
ATTORNEY

United States Patent Office 3,201,143
Patented Aug. 17, 1965

3,201,143
THREE POINT FRONT WHEEL SUSPENSION
Peter G. Drong, 2202 2nd Ave. E., Hibbing, Minn.
Filed Aug. 30, 1962, Ser. No. 220,489
3 Claims. (Cl. 280—112)

This invention relates to an improvement in three point front wheel suspension which is particularly designed for heavy duty vehicles, and deals particularly with a means for suspending the front end of a truck or similar vehicle on three points of suspension so that each wheel may flex individually of the other when passing over a rock or other such obstruction.

A very considerable expense is involved in the repair and replacement of tires used on heavy duty vehicles such as those used in hauling ore from mines, and similar vehicles used in construction work. In most such vehicles, when the front wheel of the vehicle strikes a rock or similar object, the wheel suspension is such that the greater part of the weight of the front end of the vehicle bears upon the wheel passing over such an object, thereby placing a tremendous strain upon the tire. While various means have been provided for individually suspending the wheels of vehicles, in general, these do not particularly apply to vehicles of the heavy duty type. It is an object of the present invention to provide a three point front wheel suspension for such vehicles in which the weight of the front end of the vehicle is distributed between the two front wheels, accordingly eliminating the excessive strain which is normally exerted upon the tire on one of the wheels.

A feature of the present invention resides in the provision of a three point front wheel suspension which includes a transversely extending axle which acts to support the vehicle front wheels, and in providing a resilient suspension means which is interposed between the center portion of the axle and the vehicle chassis. The suspension means is so aranged that one of the wheels may be considerably above the level of the other without imposing excessive strain upon the higher wheel and in so suspending the axle that substantially equal weight is exerted upon both of the front wheels.

A further feature of the present invention resides in the provision of a three point suspension system for the front axle of a heavy duty truck and the like which includes resilient means interposed between the central portion of the front axle and the vehicle frame so that the axle may tilt substantially in a transverse vertical plane, and so that one front wheel may be substantially above the level of the other when it strikes a rock or other such obstruction. Means are provided for holding the axle at right angles to the longitudinal axis of the frame, and means is also provided for preventing the lateral movement of the axle relative to the frame.

A feature of the present invention resides in the provision of a structure of the type described which preferably includes three transversely aligned springs interposed between the intermediate portion of the front axle and the vehicle frame. The center of these springs is preferably under slightly greater tension than the two springs on either side of the center spring so that the tilting of the axle preferably swings about the lower end of the central spring as a fulcrum point.

These and other objects and novel features of the present invention will be more clearly and fully set forth in the following specification and claims.

In the drawings forming a part of the specification:

Figure 1:
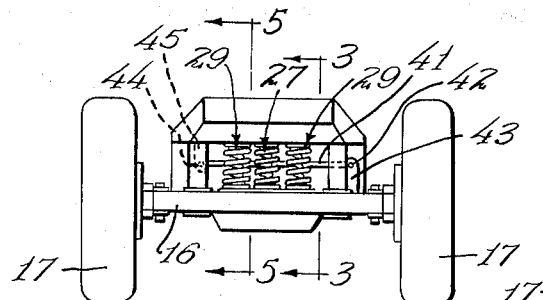
FIGURE 1 is a diagrammatic front elevational view of a vehicle frame showing the general arrangement of parts.

In view of the fact that vehicle frames and their supporting wheels are well known in the art, the drawings in the present application are diagrammatic to the extent that the means of supporting the front wheels so that the vehicle may be turned has been omitted so that the structure forming a part of the present invention may be shown in more detail. It should also be noted that only a portion of the frame is illustrated, and the vehicle body engine and attachments are ommitted.

The vehicle frame is indicated in general by the numeral 10, and includes a generally parallel pair of frame sides 11 which taper inwardly at their forward ends as indicated at 12 and which are connected together by transversely exending connecting members such as 13 and 14. The frame also preferably includes a transversely extending channel-shaped beam 15 which is mounted directly over the front axle 16 which supports the wheels 17. A channel member including a bearing plate 19 is secured to the upper surface of the axle 16 in any suitable way. In the particular arrangement illustrated, the bearing plate 19 is bolted or welded to the axle 16. A spring structure is interposed between the bearing plate 19 and an opposed bearing plate 23 underlying the channel beam 15, as will be later described.

A bracket 24 is secured to each frame side 11 at a point spaced rearwardly from the front axle 16, and each bracket 24 is attached to the rear end of a pair of torque bars 25 which are sufficiently resilient to flex upon movement of the front axle 16. Resilient cushioning means 18 separates the bar ends from each other and from the bracket and frame. The bar ends are secured by bolts 28 or other such means. The forward ends of the torque bars 25 are bolted or otherwise secured to the front axle 16 as indicated at 26. The purpose of the torque bars 25 is to hold the front axle 16 at right angles to the longitudinal axis of the frame while still permitting individual movement of either of the front wheels.

Figure 2:
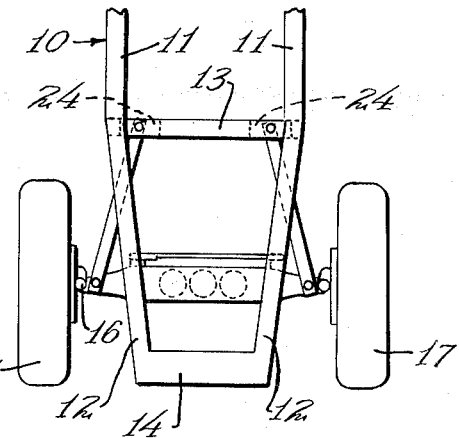
FIGURE 2 is a top plan view of the arrangement illustrated in FIGURE 1.
Figure 3:
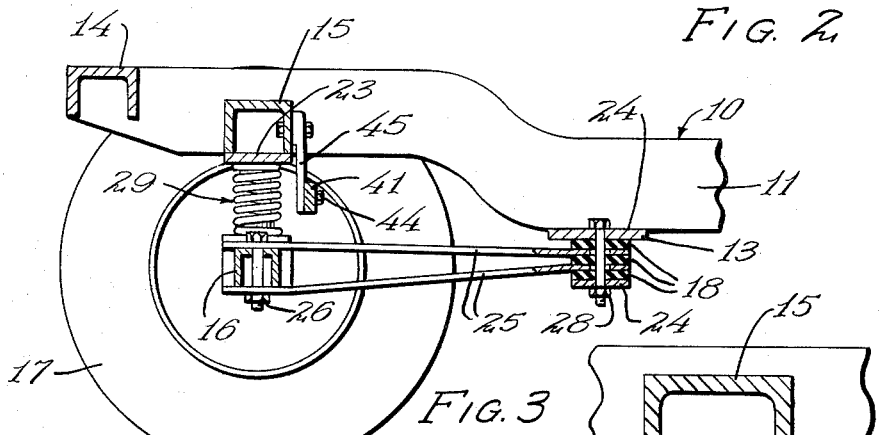
FIGURE 3 is a vertical sectional view through a portion of the construction, the position of the section being indicated by the line 3—3 of FIGURE 1.

As is indicated in FIGURES 1 and 2 of the drawings, a series of three springs is interposed between the bearing plates 19 and 23, the center spring being indicated by the numeral 27, and the outer springs being indicated by the numeral 29. The springs 27 and 29 are identical, but the center spring 27 is compressed to a greater extent than the outer spring 29 due to the provision of resilient pad used in conjunction with the center spring 27.

An upwardly projecting sleeve 30 is welded or otherwise secured to the upper surface of the bearing plate 19 for each of the three springs 27 and 29, the sleeves 30 being transversely evenly spaced. Three aligned sleeves 31 are welded or otherwise secured to the under surface of the bearing plate 23 in opposed relation to the sleeve 30. An outer spring 32 is interposed between the bearing plates 19 and 23, the ends of the springs 32 encircling the sleeves 30 and 31. A smaller diameter spring 33 extends axially of the spring 32 and is enclosed thereby. The spring 33 has its upper end 34 in spaced relation to the bearing plate 23, but the spring is of sufficient length to extend into both of the sleeves 30 and 31 so as to be held in coaxial relation to the outer spring 32. As will be evident from this description, the outer spring 32 may compress to some extent before the upper end 34 of the inner spring 33 engages the bearing plate 23. Thus after the outer spring has been compressed to some extent, the inner spring is engaged thereby adding resistance to the compression of the spring as a whole.

Figures 4, 5:
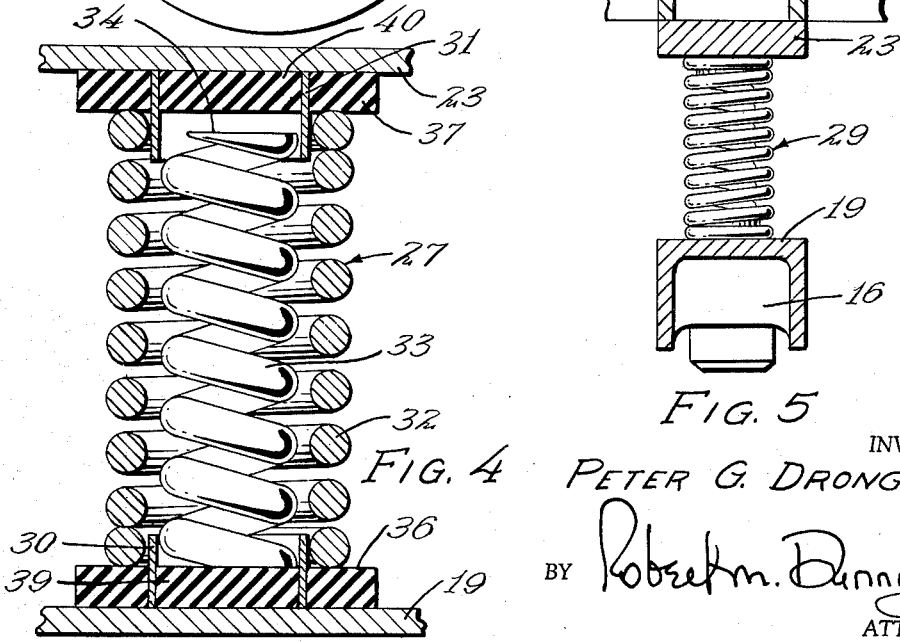
FIGURE 4 is a sectional view of a vertical plane through the intermediate spring of the spring suspension means.
FIGURE 5 is a horizontal sectional view through the spring, the position of the section being indicated by the line 5—5 of FIGURE 1.

The outer springs 29 have upper and lower ends directly engaging the bearing plates 23 and 19, respectively. However, resilient pads, shown in FIGURE 4, are interposed between the ends of the springs 32 and 33 of the center spring 27 only and these bearing plates. The ring shaped resilient pads 36 and 37 encircle the sleeves 30 and 31, respectively, and are engaged with the lower and upper ends of the outer spring 52. Resilient disks 39 and 40 are enclosed within the sleeves 30 and 31, respectively, and are engageable with the ends of the innerspring 33. The central spring 27 is thus identical with the outer spring 29 with the exception of the fact that the resilient pads 36, 37, 39, and 40 are eliminated in the outer spring units 29.

As a result of this arrangement, a greater initial compression is applied to the central spring 27 than to the outer springs 29 due to the fact that all of the springs are normally of the same length in all three units. This permits the axle to tilt about the central spring as a fulcrum point.

A stabilizer arm 41 is pivotally connected at one end 42 to a bracket 43 secured in any suitable manner to the axle 16, and the other end of the stabilizer arm is pivotally connected at 44 to a bracket 45 attached to the frame 10. The arm 41 is normally substantially horizontal so that the angularity of the arm will not vary to any great extent as the spring units 27 and 29 expand and contract. The stabilizer arm is designed to prevent the lateral movement of the axle 16 relative to the forward ends of the frame.

The operation of the apparatus is believed obvious from the foregoing description. The front axle is supported at two points by the widely spaced wheels secured at opposite ends of the axle while the center portion of the axle is supported from the frame by suitable springs. As a result, one wheel may pass over an obstruction permitting that wheel to move considerably above the level of the other wheel without materially tilting the frame. As a result, the weight of the vehicle remains distributed between the two wheels even while one wheel is passing over an obstruction, greatly reducing the strain upon the tires of the wheel passing over such obstructions, particularly on heavy duty vehicles.

In accordance with the patent statutes, I have described the principles of construction and operation of my improvement in Front Wheel Suspension, and while I have endeavored to set forth the best embodiment thereof, I desire to have it understood that changes may be made within the scope of the following claims without departing from the spirit of my invention.

I claim:
1. A front end suspension for heavy duty vehicles including in combination,
 a front axle,
 spaced wheels supported at opposite ends of said axle,
 a vehicle frame including a front end portion overlying said axle,
 a bearing plate supported by said frame above said axle,
 a cooperable bearing plate supported by said axle beneath said first mentioned bearing plate,
 a plurality of coil springs interposed between said bearing plates and connecting the center portion of the axle to the center portion of the frame,
 said springs, including a center spring and a pair of additional springs, on opposite sides of said center spring,
 means connected to said frame for holding said axle extending transversely of said frame,
 said center spring being under greater compression than said additional springs.

2. A front end suspension for heavy duty vehicles including in combination,
 a front axle,
 spaced wheels supported at opposite ends of said axle,
 a vehicle frame including a front end portion overlying said axle,
 a bearing plate supported by said frame and centrally thereof above said axle,
 a cooperable bearing plate supported by said axle beneath said first mentioned bearing plate,
 a plurality of coil springs interposed between said bearing plates and connecting the center portion of the axle to the center portion of the frame,
 means connected to said frame for holding said axle extending transversely of said frame,
 said springs including a center spring connecting the center of the axle to the center of the frame, and a pair of additional springs on opposite sides of said center spring longitudinally of said axle,
 said center spring being under greater compression than said additional springs.

3. The structure of claim 2, and in which said springs are of substantially equal length when not under compression.

References Cited by the Examiner
UNITED STATES PATENTS

| | | | |
|---|---|---|---|
| 140,192 | 6/73 | Godley | 267—4 |
| 1,509,181 | 9/24 | Sherwood | 280—124 X |
| 1,833,405 | 11/31 | Bock | 180—124 |
| 2,030,263 | 2/36 | Mercer | 280—124 |
| 2,097,445 | 11/37 | Christman | 280—96.2 |
| 3,083,982 | 4/63 | De Jong | 267—33 |

FOREIGN PATENTS 527,468  10/40  Great Britain.

A. HARRY LEVY, *Primary Examiner.*

LEO FRIAGLIA, *Examiner.*